ми

(12) United States Patent
Zhu et al.

(10) Patent No.: US 12,553,595 B2
(45) Date of Patent: Feb. 17, 2026

(54) WIRELESS-CHARGING TOUCH UNDERWATER LIGHTING DEVICE

(71) Applicants: Shanghai Sansi Electronic Engineering Co. Ltd., Shanghai (CN); Shanghai Sansi Technology Co. Ltd., Shanghai (CN); Jiashan Sansi Optoelectronic Technology Co. Ltd., Jiaxing (CN); Pujiang Sansi Optoelectronic Technology Co. Ltd., Jinhua (CN); Zhejiang Puzhao Photoelectric Technology Co.,Ltd., Jinhua (CN)

(72) Inventors: Guoli Zhu, Shanghai (CN); Shan Li, Shanghai (CN); Feng Xu, Shanghai (CN); Shichang Cao, Shanghai (CN)

(73) Assignees: Shanghai Sansi Electronic Engineering Co. Ltd., Shanghai (CN); Shanghai Sansi Technology Co. Ltd., Shanghai (CN); Hashan Sansi Optoelectronic Technology Co. Ltd., Jiaxing (CN); Pujiang Sansi Optoelectronic Technology Co. Ltd., Jinhua (CN); Zhejiang Puzhac Photoelectric Technology Co., Ltd., Jinhua (CN)

( * ) Notice: Subject to any disclaimer, the term of this patent is extended or adjusted under 35 U.S.C. 154(b) by 0 days.

(21) Appl. No.: 18/943,981

(22) Filed: Nov. 12, 2024

(65) Prior Publication Data

US 2025/0389417 A1     Dec. 25, 2025

(30) Foreign Application Priority Data

Jun. 19, 2024 (CN) .......................... 202421414538.2

(51) Int. Cl.
| | | |
|---|---|---|
| *F21V 23/04* | (2006.01) | |
| *F21S 9/02* | (2006.01) | |
| *F21V 31/00* | (2006.01) | |

(52) U.S. Cl.
CPC ............ *F21V 23/0485* (2013.01); *F21S 9/02* (2013.01); *F21V 31/005* (2013.01)

(58) Field of Classification Search
CPC ...... F21V 23/0485; F21V 31/005; F21S 9/02; F21W 2131/401
See application file for complete search history.

(56) References Cited

U.S. PATENT DOCUMENTS

| | | | | |
|---|---|---|---|---|
| 10,665,073 B1 * | 5/2020 | Richerson, Jr. | ........ | G03B 29/00 |
| 10,681,793 B1 * | 6/2020 | Sanson | ................. | H05B 45/10 |

(Continued)

*Primary Examiner* — Tsion Tumebo
(74) *Attorney, Agent, or Firm* — IPRTOP LLC (57) ABSTRACT

A wireless-charging touch underwater lighting device, including a waterproof housing including a bottom housing and a light-transmitting cover positioned above the bottom housing, with a waterproof inner cavity formed between the light-transmitting cover and the bottom housing; a circuit board within the waterproof inner cavity and light-emitting units mounted on the circuit board; a touch component mounted on the circuit board and in contact with the waterproof housing, when touching a corresponding touch area of the waterproof housing causes the touch component to send a corresponding signal to the circuit board; a power supply component electrically connected to the circuit board; a wireless-charging component connected to the circuit board and close to the bottom housing, when the bottom housing approaches an alternating magnetic field, the wireless-charging component charges the power supply component.

9 Claims, 5 Drawing Sheets

(56) References Cited

U.S. PATENT DOCUMENTS

| | | | |
|---|---|---|---|
| 2009/0276952 A1* | 11/2009 | Wooten | E04H 4/169 4/541.6 |
| 2013/0107507 A1* | 5/2013 | Tucker | F21V 23/0435 362/190 |
| 2016/0323952 A1* | 11/2016 | Li | H02J 50/12 |
| 2020/0011491 A1* | 1/2020 | Cao | H02J 7/0068 |
| 2021/0215309 A1* | 7/2021 | Tsao | H02J 7/00032 |
| 2021/0262638 A1* | 8/2021 | Zhao | F21V 11/08 |
| 2021/0301547 A1* | 9/2021 | Svendsen | F21S 8/036 |

\* cited by examiner

WIRELESS-CHARGING TOUCH UNDERWATER LIGHTING DEVICE

FIELD OF TECHNOLOGY

The present disclosure relates to the technical field of lighting fixtures, in particularly it relates to a wireless-charging touch underwater lighting device.

BACKGROUND

The complexity and variability of underwater working environments place extremely high performance requirements on lighting devices. In underwater engineering and other underwater activities, good lighting is a key factor in ensuring work safety and efficiency. However, existing underwater lighting devices often have limitations that affect work quality and safety to a certain extent.

Firstly, traditional underwater lighting devices typically use wired charging methods, which not only restrict the activity range of divers or robotic operators but also pose a risk of electric leakage due to the dragging, pulling, or damage of cables. This is particularly dangerous in underwater environments, as water is conductive; even a small leak or water ingress could cause the underwater lighting device to fail, potentially leading to serious safety incidents.

Secondly, the waterproof performance of traditional diving lights may not be ideal. Prolonged underwater operation can expose the equipment to water pressure and corrosive substances, resulting in decreased performance or damage. Additionally, the presence of cables or charging interfaces exacerbates these issues. Furthermore, existing underwater lighting devices that use buttons as control switches, along with complex and movable connection structures, pose additional challenges to waterproof performance.

To overcome these problems, the development of a new wireless-charging touch underwater lighting device is particularly important.

SUMMARY

In view of the disadvantages of the existing technology described above, the technical problem to be solved by the present disclosure is to provide a wireless-charging touch underwater lighting device that addresses the weak waterproof performance caused by the power supply interface and control buttons of existing underwater lighting fixtures.

To solve the above-mentioned technical problem, the present disclosure provides the wireless-charging touch underwater lighting device for underwater operations, including:
- a waterproof housing, the waterproof housing includes a bottom housing and a light-transmitting cover positioned above the bottom housing, and a waterproof inner cavity is formed between the light-transmitting cover and the bottom housing;
- a circuit board and a plurality of light-emitting units mounted on the circuit board, the circuit board is located within the waterproof inner cavity, and light emitted from the light-emitting units transmits outward through the light-transmitting cover;
- a touch component, the touch component is mounted on the circuit board and in contact with the waterproof housing, when touching a corresponding touch area of the waterproof housing causes the touch component to send a corresponding signal to the circuit board;
- a power supply component, the power supply component is electrically connected to the circuit board to provide electrical power to each component;
- a wireless-charging component, the wireless-charging component is electrically connected to the circuit board and is located close to the bottom housing, when the bottom housing approaches an alternating magnetic field, and the wireless-charging component generates an induced electric current and charges the power supply component through the circuit board.

As a preferred embodiment, the plurality of light-emitting units includes various lamp beads, each of the various lamp beads is configured for emitting red light, green light, or blue light, and by controlling on and off states of the various lamp beads, one or more of red light, green light, and blue light is generated to form composite light with various colors.

As a preferred embodiment, a sealing slot is provided at a junction of the light-transmitting cover and the bottom housing, and the sealing slot is sealed using one or more of potting, ultrasonic sealing, and sealing rings, thereby further enhancing waterproof performance.

As a preferred embodiment, the waterproof housing is integrally formed using an injection molding process with polycarbonate material, and the outer surface of the waterproof housing has no openings, ensuring waterproof capability, polycarbonate material also offers advantages such as weather resistance, high corrosion resistance, and good structural strength, meeting the requirements for long-term underwater deployment.

As a preferred embodiment, the waterproof housing is subjected to a smoothing treatment around its entire body and adopts a streamlined design, reducing impact of water flow on the waterproof housing, thereby stabilizing the wireless-charging touch underwater lighting device during underwater operations.

As a preferred embodiment, the touch component includes a touch spring, a first end of the touch spring is fixed to the circuit board and a second end of the touch spring faces the touch area of the waterproof housing, when the touch area is touched, a potential difference between human body and the touch spring causes the touch spring to generate a corresponding electrical signal, and the electrical signal is sent to the circuit board, and the circuit board controls on and off states of the corresponding light-emitting units based on the electrical signal.

As a preferred embodiment, the wireless-charging touch underwater lighting device further includes a wireless communication component, the circuit board is remotely controlled through the wireless communication component to manage the plurality of light-emitting units.

As a preferred embodiment, the wireless-charging touch underwater lighting device also includes counterweights positioned within the waterproof internal cavity, the counterweights can be used to adjust the overall weight of the device, allowing the wireless-charging touch underwater lighting device to either float or ascend slowly in the water.

As a preferred embodiment, the wireless-charging touch underwater lighting device also includes magnetic components positioned within the waterproof internal cavity, the magnetic components facilitate the fixation of the device during wireless-charging, allowing it to be secured magnetically both during charging and underwater.

As a preferred embodiment, the power supply component includes a battery, the battery is used to store and release electrical energy.

As described above, the wireless-charging touch underwater lighting device of the present disclosure has the following beneficial effects: during underwater operations, the device directly powers the light-emitting units through the power supply component, freeing it from the constraints of power supply cables and significantly increasing the versatility and convenience of use; when the energy of the power supply component is depleted, it can be recharged wirelessly, avoiding the need for a wired charging port that could compromise waterproof performance. Moreover, this wireless-charging touch underwater lighting device uses a touch control method. Compared to traditional underwater lighting fixtures that use button controls, this design eliminates the need for reserving button openings, further enhancing waterproof performance;

In summary, the wireless-charging touch underwater lighting device of the present disclosure, through its wireless-charging and touch control solutions, meets power supply and control needs while ensuring that no openings are required on the waterproof housing. This significantly reduces the risk of water ingress and addresses the weak waterproof performance caused by power supply interfaces and control buttons in existing underwater lighting devices.

REFERENCE NUMERALS

1 Waterproof housing
11 Bottom housing
111 Buckle
112 Fixing pillar
113 Magnetic slot
114 Counterweight slot
115 Coil slot
116 Battery compartment
12 Light-transmitting cover
121 Touch area
122 Socket
123 Light guide column
124 Optical lens
125 Spring mounting slot
126 Sealing slot
2 Circuit board
21 Light-emitting unit
22 Fixing hole
23 Charging indicator light
3 Touch spring
4 Battery
5 Receiving coil
6 Magnetic component
7 Counterweight

DETAILED DESCRIPTION

The embodiments of the present disclosure will be described below. Those skilled can easily understand disclosure advantages and effects of the present disclosure according to contents disclosed by the specification.

It should be noted that the structure, ratio, size, etc. shown in the accompanying drawings in this specification are only used to illustrate the content disclosed in the specification for the understanding and reading of those familiar with this technology, and are not intended to limit the implementation of the present invention. Any structural modification, proportional relationship change or size adjustment should still fall within the scope of the present disclosure, given that no effect and objective achievable by the present disclosure are hindered. The following detailed description should not be considered as restrictive, and the scope of the embodiments of the present disclosure is limited only by the claims of the published patent. The terms used herein are only intended to describe specific embodiments and are not intended to restrict the present disclosure. Spatial-related terms, such as "up", "down", "left", "right", "below", "under", "beneath", "above", "over", etc., can be used herein to facilitate the description of the relationship between one element or feature and another element or feature shown in the figure.

In the present disclosure, unless otherwise expressly specified and qualified, the terms "mounting", "connecting", "linking", "fixing", "securing", etc., are to be understood in a broad sense. For example, there may be a fixed connection, a removable connection, or a connection in one piece; there may be a mechanical connection or an electrical connection; there may be a direct connection or an indirect connection through an intermediate medium, and there may be a connection within the two elements. For ordinary technicians in this field, the specific meanings of the above terms in this disclosure can be understood according to the specific circumstances.

As used herein, the singular forms "a", "an" and "said/the" are intended to comprise the plural forms, unless the context clearly points out differently. It should be further understood that the terms "include" and "comprise" indicate the existence of the described features, steps, elements, components, items, categories, and/or groups, but do not exclude the existence, presence, or addition of one or more other features, steps, elements, components, items, categories, and/or groups. As used herein, the terms "or" and "and/or" are inclusive, and are used to comprise any of the associated listed items and all combinations thereof. Thus, "A, B or C" or "A, B and/or C" means "any of the following: A; B; C; A and B; A and C; B and C; A, B and C". Exceptions to this definition apply only when combinations of elements, functions, steps are inherently paradoxical in some way.

As shown in FIGS. 1-9, the present disclosure provides a wireless-charging touch underwater lighting device for underwater operations, including:
  a waterproof housing 1, wherein the waterproof housing 1 includes a bottom housing 11 and a light-transmitting cover 12 positioned above the bottom housing 11, and a waterproof inner cavity is formed between the light-transmitting cover 12 and the bottom housing 11;
  a circuit board 2 and a plurality of light-emitting units 21 mounted on the circuit board 2, wherein the circuit board 2 is located within the waterproof inner cavity, and light emitted from the light-emitting units 21 transmits outward through the light-transmitting cover 12;
  a touch component, wherein the touch component is mounted on the circuit board 2 and in contact with the waterproof housing 1, and touching a corresponding touch area 121 of the waterproof housing 1 causes the touch component to send a corresponding signal to the circuit board 2;
  a power supply component, wherein the power supply component is electrically connected to the circuit board 2 to provide electrical power to each component;
  a wireless-charging component, the wireless-charging component is electrically connected to the circuit board 2 and is located close to the bottom housing 11, when the bottom housing 11 approaches an alternating magnetic field, and the wireless-charging component generates an induced electric current and charges the power supply component through the circuit board 2.

To better introduce the wireless-charging touch underwater lighting device of the present disclosure, the following specific application is described: when the wireless-charging touch underwater lighting device operates underwater, the device directly powers the light-emitting units 21 through the power supply component, freeing the device from the constraints of power supply cables and greatly increasing usability and convenience; when the energy of the power supply component is depleted, the device can be recharged wirelessly, avoiding the need for a wired-charging port that could compromise waterproof performance. Furthermore, the wireless-charging touch underwater lighting device of the present disclosure uses touch control, eliminating the need for reserved button openings as seen in traditional underwater lighting fixtures, this further enhances waterproof performance, the wireless-charging touch underwater lighting device, through its wireless charging and touch control solutions, meets power supply and control needs without requiring any openings on the waterproof housing. This significantly reduces the risk of water ingress and addresses the weak waterproof performance caused by power supply interfaces and control buttons in existing underwater lighting devices.

Figure 6:
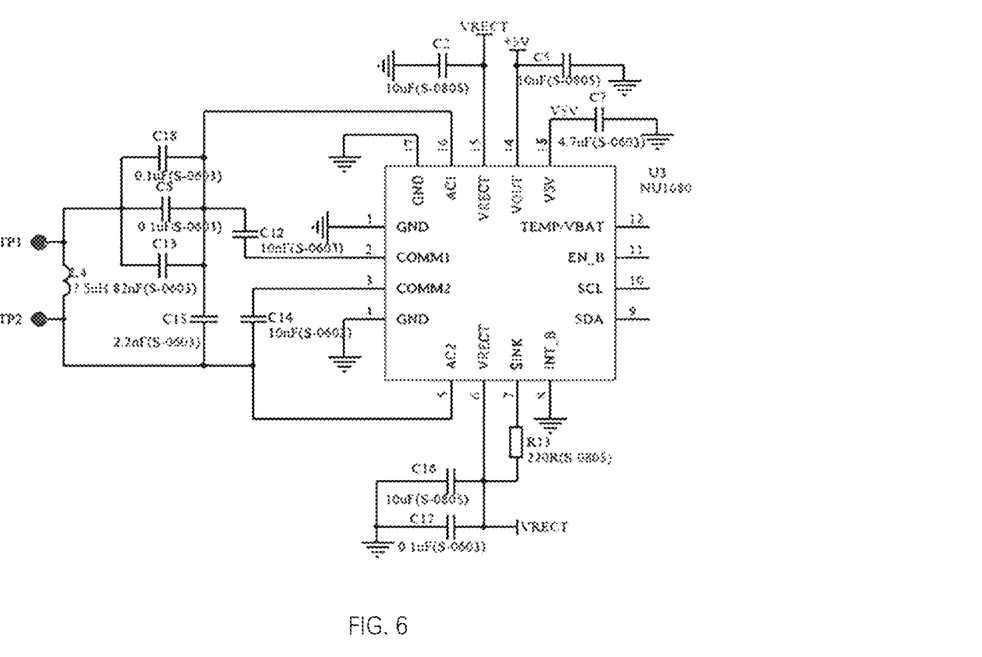
FIG. 6 shows a schematic diagram of a receiving chip of a wireless-charging touch underwater lighting device according to one embodiment of the present disclosure.
Figure 7:
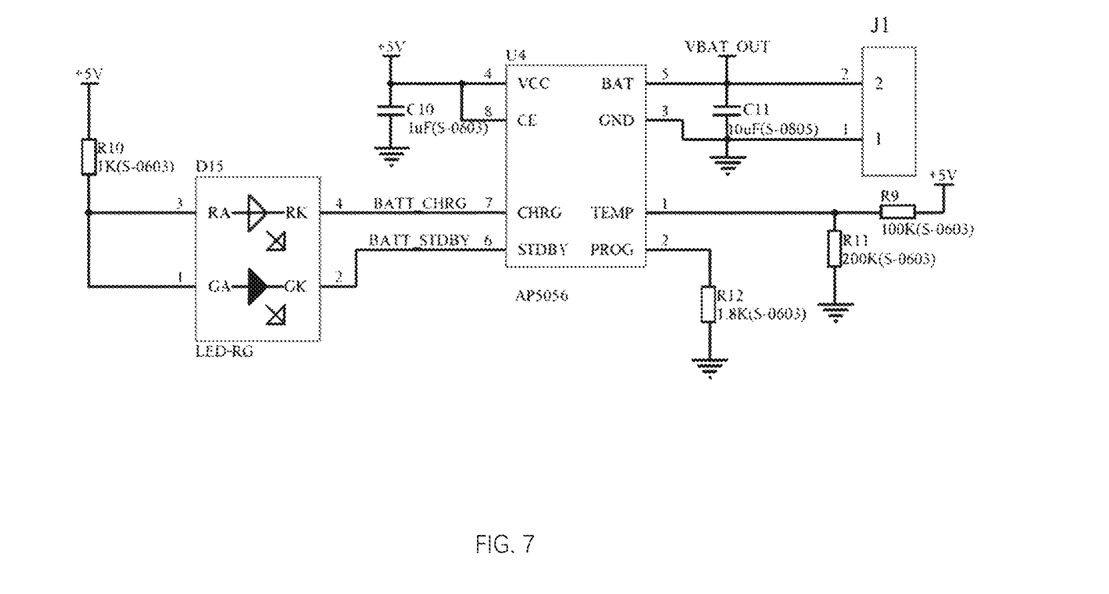
FIG. 7 shows a schematic diagram of a charging management chip of a wireless-charging touch underwater lighting device according to one embodiment of the present disclosure.

As an example, the wireless-charging component includes a receiving coil 5, a receiving chip soldered to the circuit board 2, and a charging management chip; the specific charging process using a wireless charger is as follows: first, the wireless charger includes a transmitting coil and a corresponding power source, the power source provides an alternating current to the transmitting coil, as the alternating current passes through the coil, the coil generates an alternating magnetic field around itself according to Faraday's law of electromagnetic induction. When the receiving coil of the wireless-charging component is in the alternating magnetic field, a changing magnetic field induces an electromotive force in the receiving coil, generating an alternating electric current, this alternating electric current is input to the receiving chip, where the receiving chip undergoes rectification and voltage reduction, outputting a 5V direct electric current to the charging management chip, the 5V direct electric current ultimately charges the power supply component. Specifically, in one embodiment, the receiving chip is a NU1680 chip, and the charging management chip is a BL4056 chip. The alternating electric current enters the receiving chip through Pin16 and Pin5. After rectification and voltage reduction, a 5V direct electric current is output from Pin16 of the receiving chip, the 5V direct current is input to Pin4 of the charging management chip U4/BL4056, and finally, a 4.2V power source is output from Pin5 of the charging management chip to charge the power supply component, as shown in FIGS. 6-7.

Figure 1:
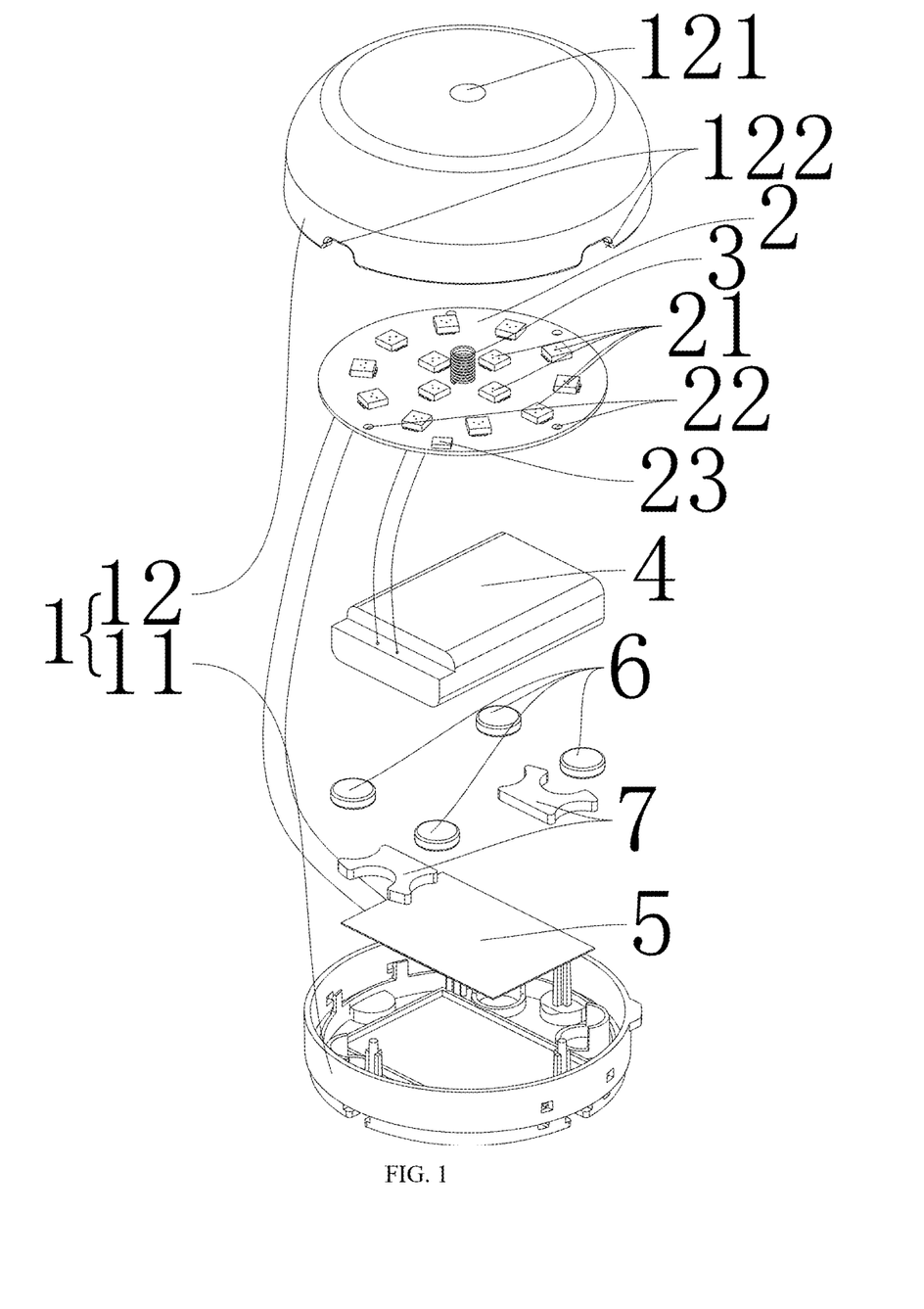
FIG. 1 shows an exploded view of a wireless-charging touch underwater lighting device according to one embodiment of the present disclosure.
Figure 2:
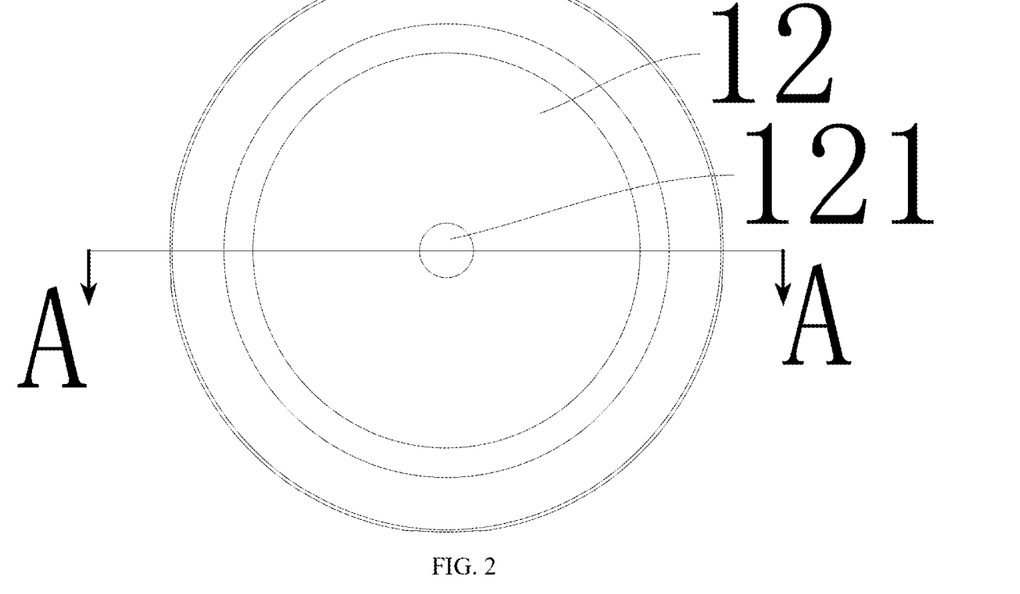
FIG. 2 shows a top view of a wireless-charging touch underwater lighting device according to one embodiment of the present disclosure.

As an example, as shown in FIG. 1, the plurality of light-emitting units 21 includes various lamp beads, each of the various lamp beads is configured for emitting red light, green light, or blue light, and by controlling on and off states of the various lamp beads, one or more of red light, green light, and blue light is generated to form composite light with various colors; furthermore, as an example, the light source utilizes LED beads. LED beads offer advantages such as high energy efficiency, long lifespan, rapid response, environmental friendliness, and dimmable characteristics, making them particularly suitable for use in underwater lighting fixtures.

Figure 3:
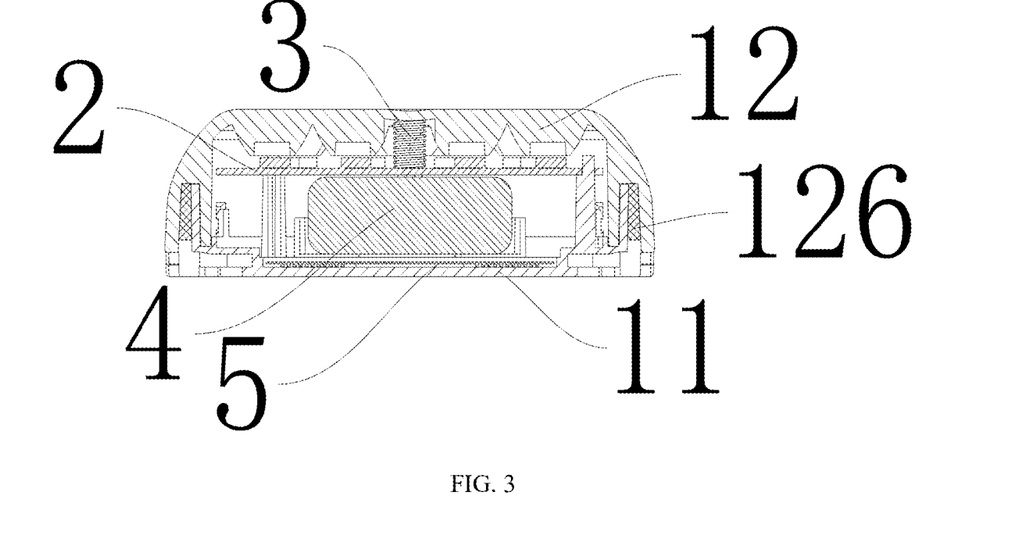
FIG. 3 shows a cross-sectional view along Line A-A of FIG. 2.

As an example, as shown in FIG. 3, a sealing slot 126 is provided at a junction between the light-transmitting cover 12 and the bottom housing 11, and the sealing slot 126 is sealed using one or more of potting, ultrasonic sealing, and sealing rings, thereby further enhancing waterproof performance.

As an example, the waterproof housing 1 is integrally formed by an injection molding process using a polycarbonate material, and an outer surface of the waterproof housing 1 is free of any openings, ensuring its waterproof capability.

As an example, as shown in FIG. 1, the waterproof housing 1 is subjected to a smoothing treatment around its entire body and adopts a streamlined design, reducing impact of water flow on the waterproof housing 1, thereby stabilizing the wireless-charging touch underwater lighting device during underwater operations.

Figure 9:
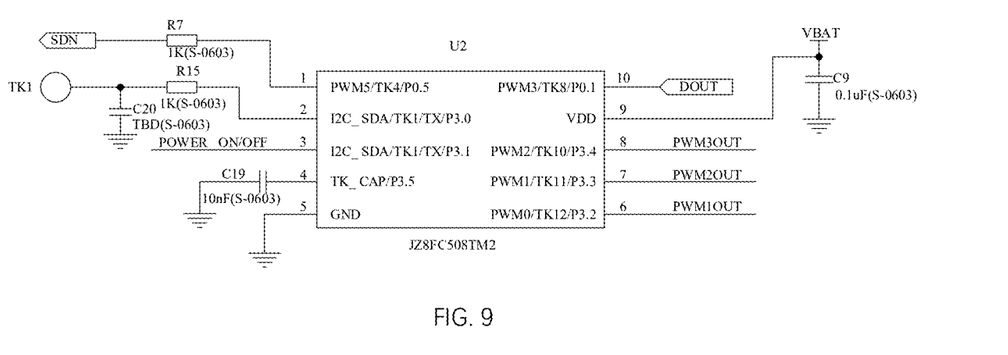
FIG. 9 shows a schematic diagram of a control chip of a wireless-charging touch underwater lighting device according to one embodiment of the present disclosure

As an example, as shown in FIG. 1, the touch component includes a touch spring 3; one end of the touch spring is fixed to the circuit board 2, and the other end faces the touch area 121 of the waterproof housing 1; when the touch area 121 is touched, the potential difference between the human body and the touch spring generates a corresponding electrical signal in the touch spring, and then this electrical signal is sent to the circuit board 2; then the electrical signal controls the on and off operation of the corresponding light-emitting units 21 based on the signal; furthermore, as an example, the touch component also includes a control chip soldered to the circuit board 2, when a finger touches the touch area 121, the capacitance at the contact point of the touch area changes, causing the frequency of the connected oscillator to vary. The control chip detects this change in frequency and, after identification processing, outputs different PWM signals to control the light-emitting units 21. Specifically, as an example, if the touch area 121 is pressed twice consecutively, the wireless-charging touch underwater lighting device will power on, if pressed twice again, the wireless-charging touch underwater lighting device will power off, after powering on, pressing it three times can control the on and off state of the light source, allowing the RGB lighting to switch between various color combinations. More specifically, as an example, the control chip used is a JZ8FC508TM2 chip, as shown in FIG. 9.

Figure 8:
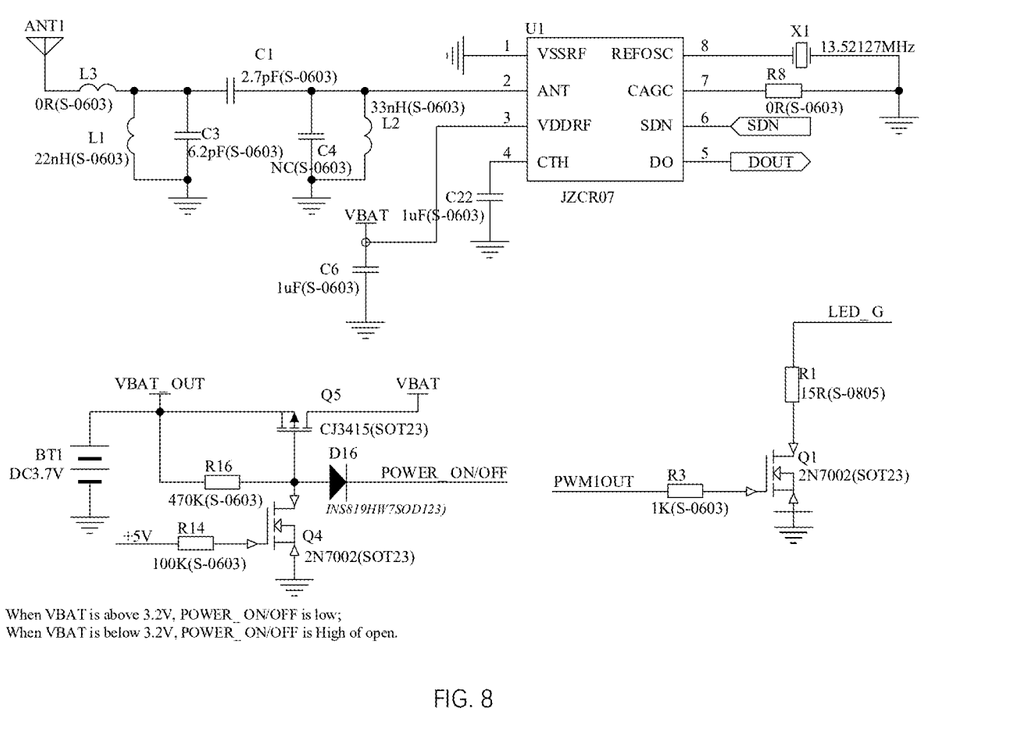
FIG. 8 shows a schematic diagram of a communication chip of a wireless-charging touch underwater lighting device according to one embodiment of the present disclosure.

As an example, the wireless-charging touch underwater lighting device also includes a wireless communication component, and the wireless communication component allows for remote control of the circuit board 2 to manage several light-emitting units 21. More specifically, the wireless communication component includes a communication chip; when the communication chip receives a carrier signal from a remote-control terminal, it demodulates the signal to generate a modulation signal; the modulation signal is then output to the control chip; the control chip processes the modulation signal according to different code values and outputs various PWM signals for control. Furthermore, as an example, the remote-control terminal can be a wireless communication device with corresponding control software installed, such as a laptop or smartphone, or it can be a dedicated remote controller. More specifically, the communication chip used is a JZCR07 chip, with the modulation signal output from its Pin5 and then input to Pin10 of the control chip JZ8FC508TM2, as shown in FIG. 8.

As an example, as shown in FIG. 1, the wireless-charging touch underwater lighting device also includes counterweights 7 positioned within the waterproof internal cavity, and the counterweights 7 can be used to adjust the overall weight of the device, allowing the wireless-charging touch underwater lighting device to either float or ascend slowly in the water.

As an example, as shown in FIG. 1, the wireless-charging touch underwater lighting device also includes magnetic components 6 positioned within the waterproof internal cavity; the magnetic components 6 facilitate the fixation of the device during wireless-charging, allowing it to be secured magnetically. Furthermore, as an example, the magnetic components 6 are high magnetic neodymium-iron-boron magnets, the high magnetic neodymium-iron-boron magnets offer strong magnetic force and have nickel-plated surfaces for improved weather resistance and salt fog performance.

As an example, as shown in FIG. 1, the power supply component includes a battery 4, which is used to store and release electrical energy; moreover, as an example, the battery 4 is a polymer ternary lithium battery, known for its small size, large capacity, and stable output characteristics.

Figure 4:
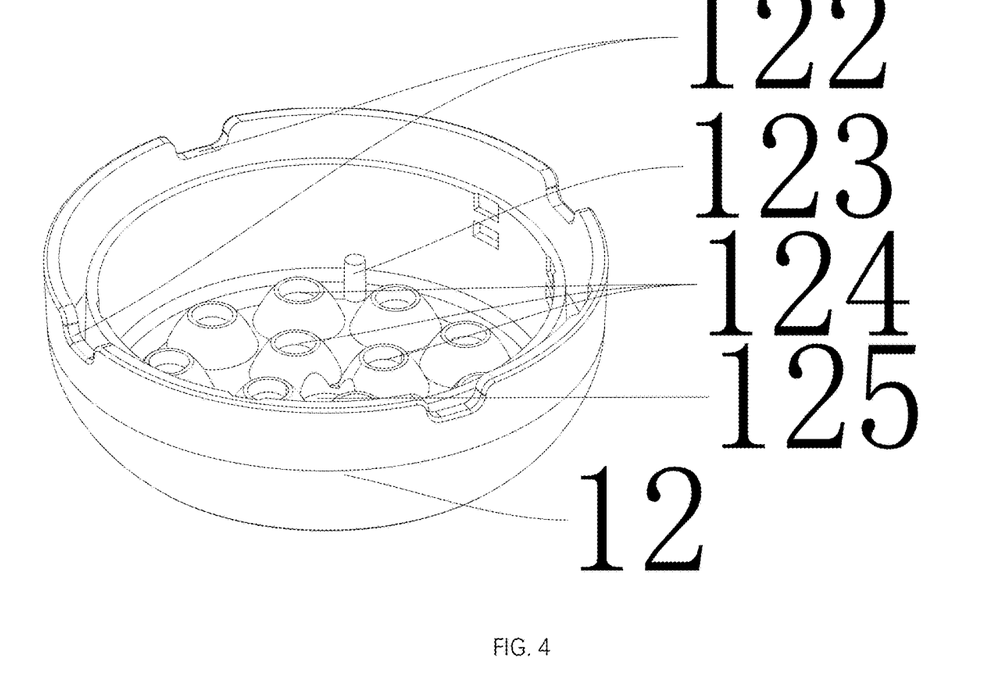
FIG. 4 shows a schematic diagram of a light-transmitting cover of a wireless-charging touch underwater lighting device according to one embodiment of the present disclosure.

As an example, as shown in FIG. 1 and FIG. 4, the wireless-charging touch underwater lighting device also includes a charging indicator light 23. The charging indicator light is mounted on the circuit board 2, and a light guide column 123 corresponding to the charging indicator light is positioned on the light-transmitting cover 12. The light emitted by the charging indicator light 23 passes through the light guide column 123 and projects out from the light-transmitting cover 12. Furthermore, multiple optical lenses 124 are also arranged on the light-transmitting cover 12 corresponding to the light-emitting units 21, The optical lenses 124 redistribute the emitted light from the light-emitting units to meet specific requirements for underwater operations. Additionally, the outer contour of the light-transmitting cover 12 is a circular shell, and the touch area 121 located at the center of the outer surface of the light-transmitting cover, the inner surface of the light-transmitting cover 1 corresponding to the touch area 121 is provided with a spring mounting slot 125 to accommodate the touch spring 3, ensuring that the other end of the touch spring 3 can align directly with the touch area 121.

Figure 5:
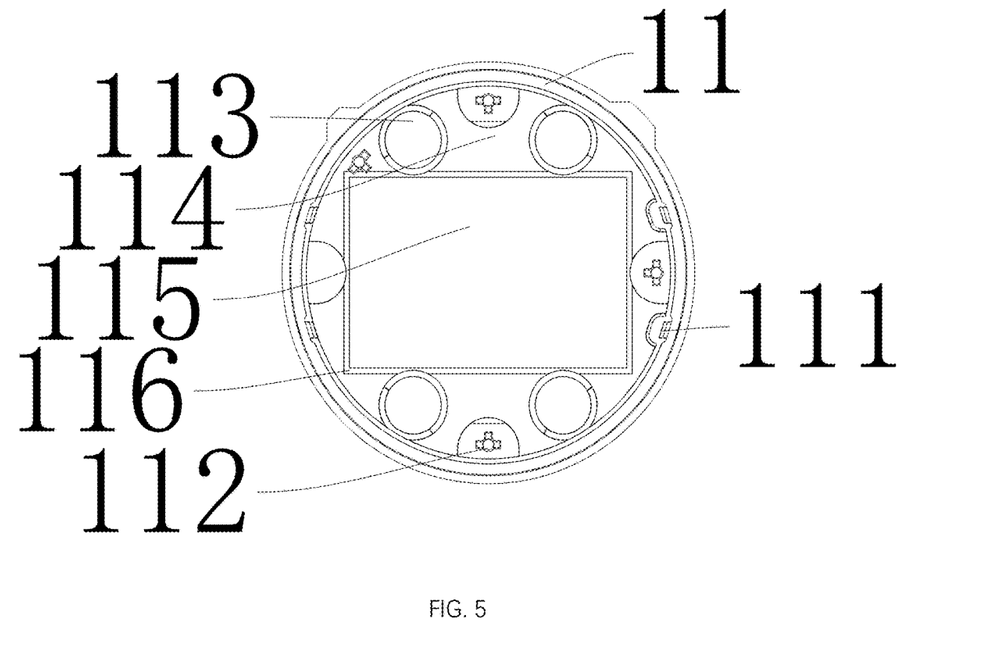
FIG. 5 shows a schematic diagram of a bottom housing of a wireless-charging touch underwater lighting device according to one embodiment of the present disclosure.

As an example, as shown in FIG. 1 and FIG. 5, the edge of the light-transmitting cover 12 is equipped with several sockets 122, correspondingly, the edge of the bottom housing 11 is fitted with several buckles 111 that match with the sockets 122; the sockets 122 are configured to be engaged with the buckles 111, and the positioning pillars are configured to be inserted into the positioning holes to securely fix the light-transmitting cover 12 to the bottom housing 11. Furthermore, as an example, the bottom housing 11 is also equipped with several components, including fixing pillars 112 for securing the circuit board 2, magnetic slots 113 for installing the magnetic components 6, a counterweight slot 114 for installing the counterweights 7, a coil slot 115 for securing the receiving coil 5, and a battery compartment 116 for holding the battery 4. The circuit board 2 is also provided with fixing holes 22 corresponding to the fixing pillars 112.

Furthermore, as an example, an assembly process of the wireless-charging touch underwater lighting device includes the following steps:

1. Cleaning the bottom housing 11, and ensuring the surface is free of scratches, oil, and other contaminants;
2. Installing the magnetic components 6, and fitting the magnetic components tightly into the bottom housing 11 by placing it in the magnetic slots 113.
3. Installing the counterweights 7, and securing the counterweight tightly into the bottom housing 11 by placing it in the corresponding counterweight slot 114.
4. Installing the receiving coil 5, and positioning the receiving coil in the coil slot 115 of the bottom housing 11.
5. Wiring and connecting the corresponding cables between the receiving coil 5, the battery 4, and the circuit board 2.
6. Installing the battery 4, and securing the battery in its designated battery compartment 116.
7. Installing the circuit board 2, aligning the fixing holes 22 on the circuit board with the fixing pillars 112 on the bottom housing 11, and using a heat tool to soften the plastic for securing the circuit board in place.
8. Installing the light-transmitting cover 12, securely fastening the sockets 122 of the light-transmitting cover 12 to the buckles 111 of the bottom housing 11, ensuring that the touch spring 3 is positioned within the spring mounting slot 125 and is pressed against the light-transmitting cover 12, after proper assembly, the bottom surface of the bottom housing 11 should be flush with the bottom surface of the light-transmitting cover 12.
9. After assembly is complete, pouring adhesive into the sealing slot 126 to ensure waterproofing.

In summary, the wireless-charging touch underwater lighting device of the present disclosure has the following advantages:

1. Wireless-charging functionality: the wireless-charging component allows for charging without plugging and unplugging, enhancing convenience and improving the waterproofing of the device.
2. Touch control operation: the use of a touch component for operation eliminates waterproof issues associated with physical buttons, enhancing user experience.
3. High waterproof performance design: the waterproof housing 1 is provided with a no-hole design, combined with the sealing slot 126 adhesive or secondary injection molding, significantly improving waterproof performance.
4. RGB multicolor light-emitting units 21: the light-emitting units 21 includes RGB LEDs, allowing for the emission of various colors of light to meet different underwater lighting needs.

5. Efficient power supply component: a polymer ternary lithium battery 4 is utilized as the power source, and polymer ternary lithium batteries boast a small size, large capacity, and stable output.
6. Streamlined Shell Design: the smooth and streamlined design of the shell reduces water resistance, enhancing the stability of the device in water.
7. Built-in counterweights 7: the built-in counterweight 7 adjusts the weight of the fixture, allowing it to float or ascend slowly, enhancing adaptability for underwater operations.
8. Built-in magnetic components 6: Built-in magnetic components facilitate the fixation of the light fixture during wireless charging, and are made from high magnetic materials to ensure weather resistance and salt fog performance.
9. Charging status indication: the design of the charging indicator light 23 and light guide column 123 provides a clear display of the charging status.
10. Remote wireless communication: the wireless communication component enables remote control, increasing operational flexibility.
11. Optimized light distribution: the optical lenses 124 on the light-transmitting cover 12 redistribute light from the light-emitting units 21 to meet specific underwater operational needs.
12. Precise component positioning: The design of the sockets 122 and buckles 111 ensures precise fixation of the light-transmitting cover 12 to the bottom housing 11.

This wireless-charging touch underwater lighting device of the present disclosure integrates wireless-charging technology and touch control operation, offering a solution with high waterproof performance, ease of use, and adaptability to various underwater lighting needs. Its innovative waterproof design, efficient power supply component, streamlined shell, built-in counterweights 7, magnetic components 6, and charging status indication contribute to the outstanding stability of the device and reliability during underwater operations. Additionally, the design of the RGB multicolor light-emitting units 21 and remote wireless communication component further enhances the functionality and flexibility of the lighting device. Overall, the underwater light design of the present disclosure overcomes the limitations of traditional underwater lighting equipment, providing users with an efficient, safe, and user-friendly underwater lighting tool. Therefore, the present disclosure effectively overcomes various shortcomings of the prior art and has a high industrial value.

The above-mentioned embodiments are merely illustrative of the principle and effects of the present disclosure instead of restricting the scope of the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A wireless-charging touch underwater lighting device for underwater operations, comprising: a waterproof housing (1), wherein the waterproof housing (1) comprises a bottom housing (11) and a light-transmitting cover (12) positioned above the bottom housing (11), and wherein a waterproof inner cavity is formed between the light-transmitting cover (12) and the bottom housing (11); a circuit board (2) and a plurality of light-emitting units (21) mounted on the circuit board (2), wherein the circuit board (2) is located within the waterproof inner cavity, and light emitted from the light-emitting units (21) transmits outward through the light-transmitting cover (12); a touch component, wherein the touch component is mounted on the circuit board (2) and in contact with the waterproof housing (1), wherein touching a corresponding touch area (121) of the waterproof housing (1) causes the touch component to send a corresponding signal to the circuit board (2); a power supply component, wherein the power supply component is electrically connected to the circuit board (2) to provide electrical power to each component; and a wireless-charging component, wherein the wireless-charging component is electrically connected to the circuit board (2) and is located close to the bottom housing (11), wherein when the bottom housing (11) approaches an alternating magnetic field, and the wireless-charging component generates an induced electric current and charges the power supply component through the circuit board; wherein the wireless-charging component comprises a receiving coil (5), a receiving chip soldered to the circuit board (2), and a charging management chip; and a counterweight (7) within the waterproof inner cavity; wherein the bottom housing (11) further comprises fixing pillars (112) for securing the circuit board (2), a counterweight slot (114) for installing the counterweights (7), a coil slot (115) for securing the receiving coil (5), and a battery compartment (116) for holding the battery (4); wherein a plurality of optical lenses (124) is arranged on the light-transmitting cover (12) corresponding to the light-emitting units (21).

2. The wireless-charging touch underwater lighting device according to claim 1, wherein the plurality of light-emitting units (21) comprises various lamp beads, wherein each of the various lamp beads is configured for emitting red light, green light, or blue light, and by controlling on and off states of the various lamp beads, one or more of red light, green light, and blue light is generated to form composite light with various colors.

3. The wireless-charging touch underwater lighting device according to claim 1, wherein a sealing slot (126) is provided at a junction of the light-transmitting cover (12) and the bottom housing (11), and the sealing slot (126) is sealed using one or more of potting, ultrasonic sealing, and sealing rings, thereby further enhancing waterproof performance.

4. The wireless-charging touch underwater lighting device according to claim 1, wherein the waterproof housing (1) is integrally formed by an injection molding process using a polycarbonate material, and an outer surface of the waterproof housing (1) is free of any openings, ensuring its waterproof capability.

5. The wireless-charging touch underwater lighting device according to claim 1, wherein the waterproof housing (1) is subjected to a smoothing treatment around its entire body and adopts a streamlined design, reducing impact of water flow on the waterproof housing (1), thereby stabilizing the wireless-charging touch underwater lighting device during underwater operations.

6. The wireless-charging touch underwater lighting device according to claim 1, wherein the touch component comprises a touch spring (3), a first end of the touch spring (3) is fixed to the circuit board (2) and a second end of the touch spring (3) faces the touch area (121) of the waterproof housing (1), when the touch area (121) is touched, a potential difference between human body and the touch spring (3)

causes the touch spring (3) to generate a corresponding electrical signal, and the electrical signal is sent to the circuit board (2), and wherein the circuit board (2) controls on and off states of the corresponding light-emitting units (21) based on the electrical signal.

7. The wireless-charging touch underwater lighting device according to claim 1, wherein the wireless-charging touch underwater lighting device further comprises a wireless communication component, wherein the circuit board (2) is remotely controlled through the wireless communication component to manage the plurality of light-emitting units (21).

8. The wireless-charging touch underwater lighting device according to claim 1, further comprising a magnetic component (6) within the waterproof inner cavity.

9. The wireless-charging touch underwater lighting device according to claim 1, wherein the power supply component comprises a battery (4), and the battery (4) is configured to store and release electric energy.

\* \* \* \* \*